Figure 1:
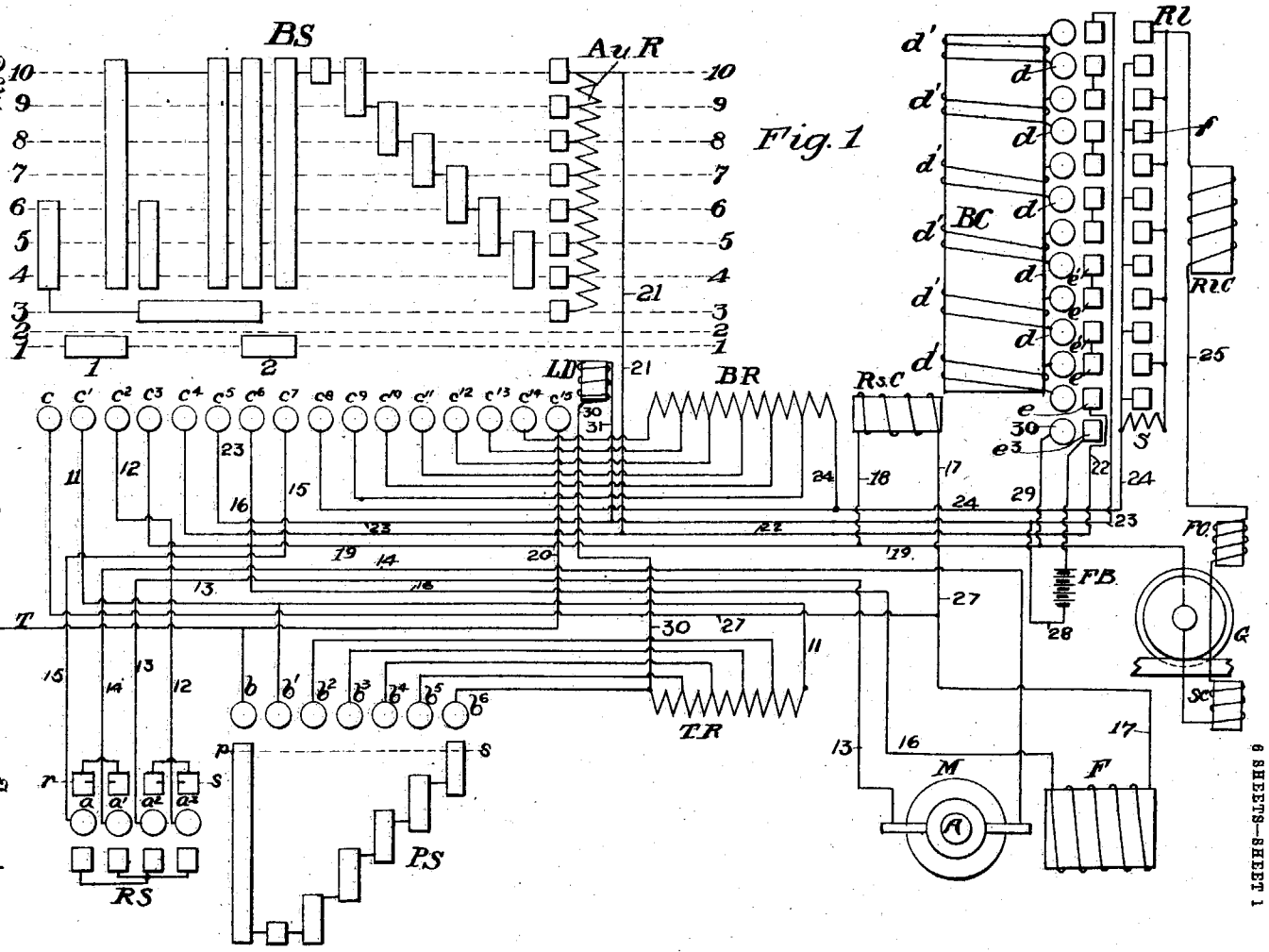

No. 12,098. REISSUED MAR. 10, 1903.

J. N. MAHONEY.

ELECTRIC BRAKE FOR VEHICLES.

APPLICATION FILED JAN. 14, 1903.

6 SHEETS—SHEET 1

No. 12,098. REISSUED MAR. 10, 1903.

J. N. MAHONEY.

ELECTRIC BRAKE FOR VEHICLES.

APPLICATION FILED JAN. 14, 1903.

6 SHEETS—SHEET 2.

Witnesses
L. L. Parmenter
W. A. Stahlin

Inventor
Joseph N. Mahoney
By his Attorneys
Baldwin, Davidson & Wight

No. 12,098.
REISSUED MAR. 10, 1903.
J. N. MAHONEY.
ELECTRIC BRAKE FOR VEHICLES.
APPLICATION FILED JAN. 14, 1903.
6 SHEETS—SHEET 3.
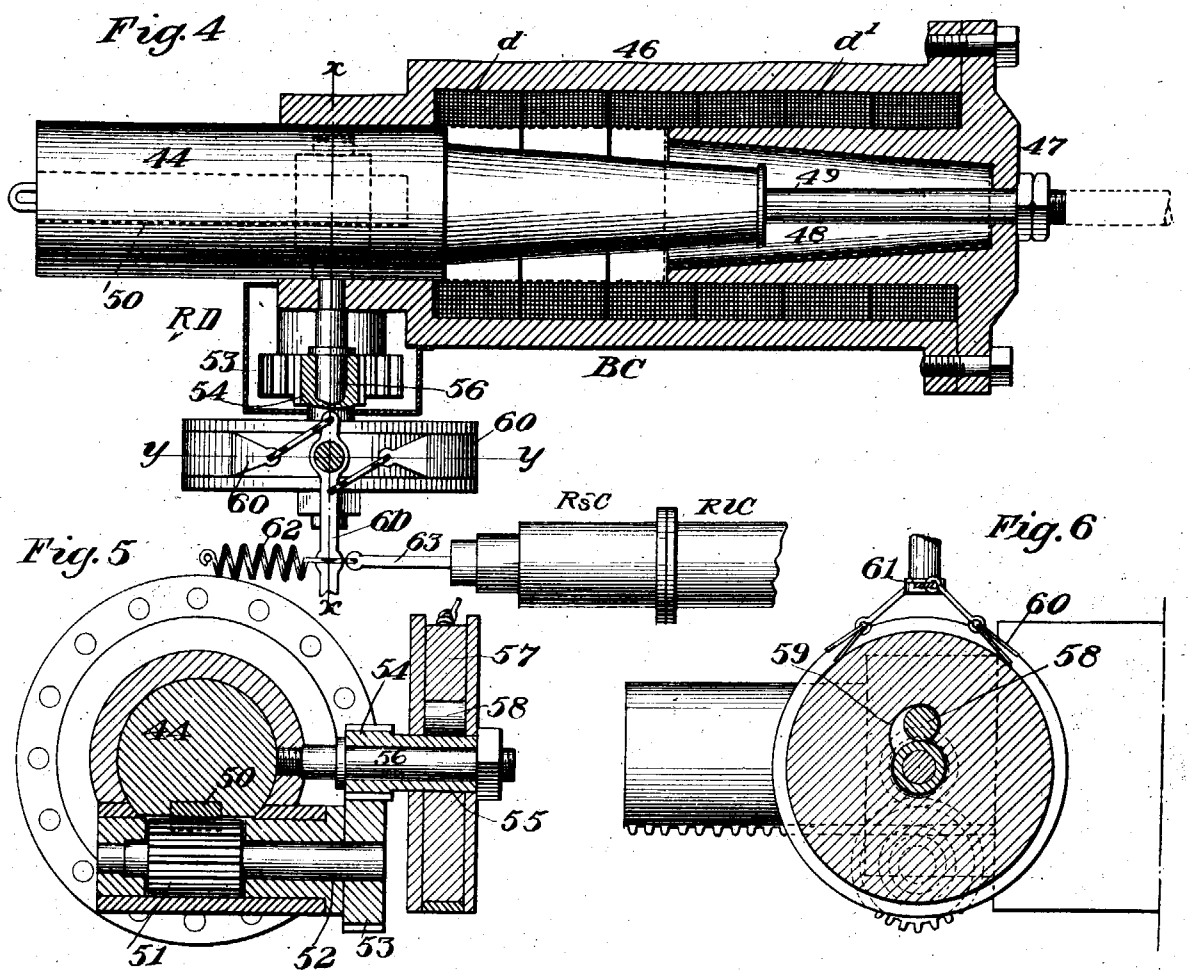
Witnesses
L. L. Browning
W. A. Stahlin
Inventor
Joseph N. Mahoney
By his Attorneys
Baldwin, Davidson & Wright No. 12,098. REISSUED MAR. 10, 1903.
J. N. MAHONEY.
ELECTRIC BRAKE FOR VEHICLES.
APPLICATION FILED JAN. 14, 1903.
6 SHEETS—SHEET 4.
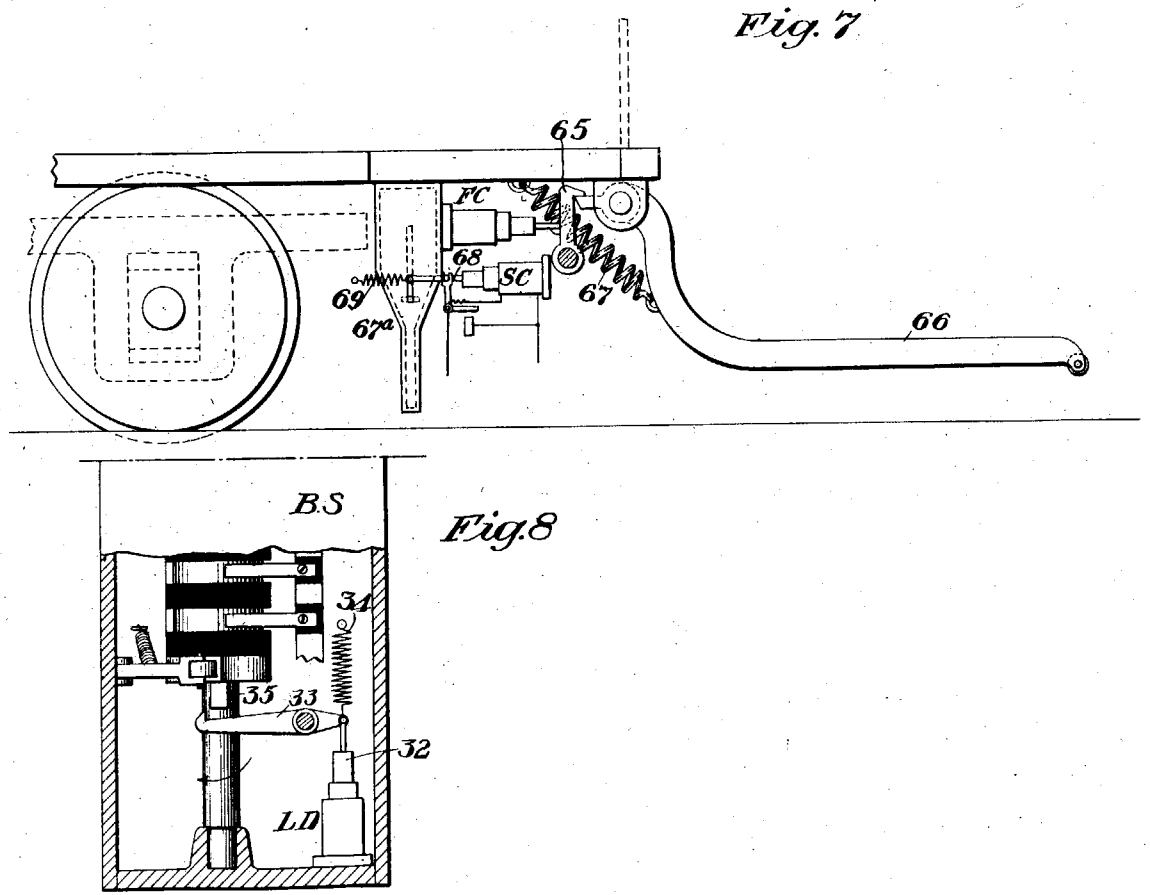
Witnesses
L. L. Browning
W. A. Stahlin
Inventor
Joseph N. Mahoney
By his Attorneys
Baldwin, Davidson & Wright No. 12,098. REISSUED MAR. 10, 1903.
J. N. MAHONEY.
ELECTRIC BRAKE FOR VEHICLES.
APPLICATION FILED JAN. 14, 1903.
6 SHEETS—SHEET 5.
Diagram A¹
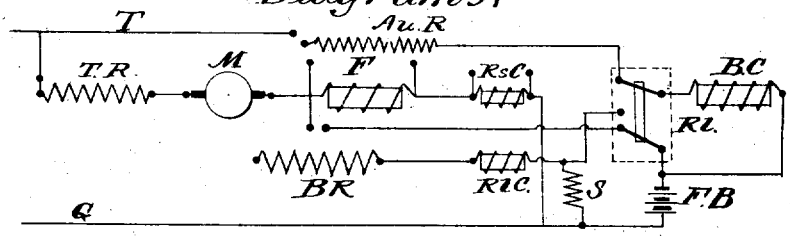
Diagram A²
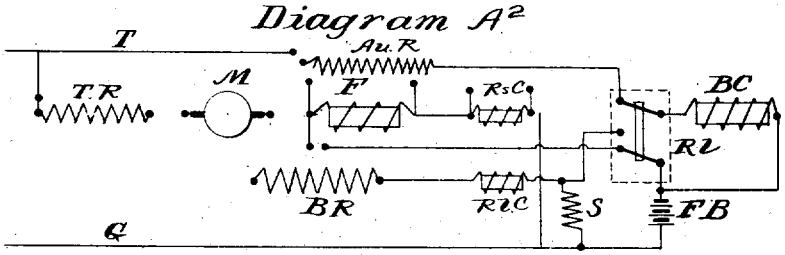
Diagram A³
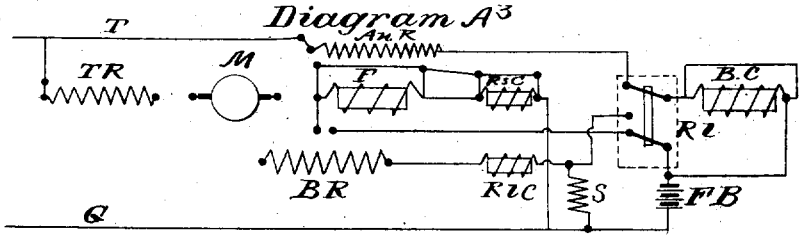
Diagram A⁴
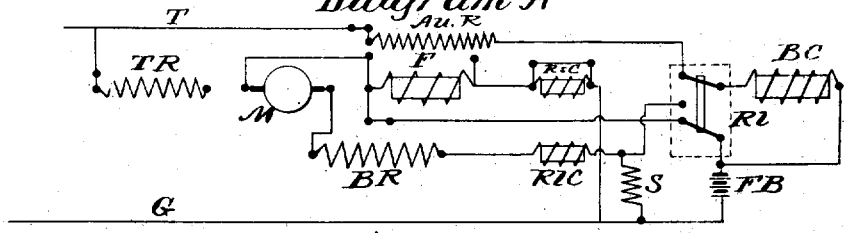
Diagram A⁵
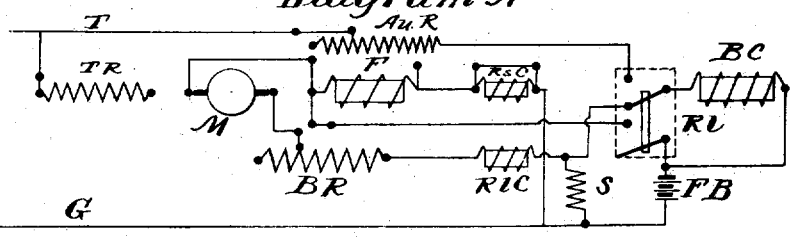
Witnesses
L. L. Browning
W. A. Stahlin
Inventor
Joseph N. Mahoney
By his Attorneys
Baldwin, Wenderoth & Wight No. 12,098. REISSUED MAR. 10, 1903.
J. N. MAHONEY.
ELECTRIC BRAKE FOR VEHICLES.
APPLICATION FILED JAN. 14, 1903.
6 SHEETS—SHEET 6.
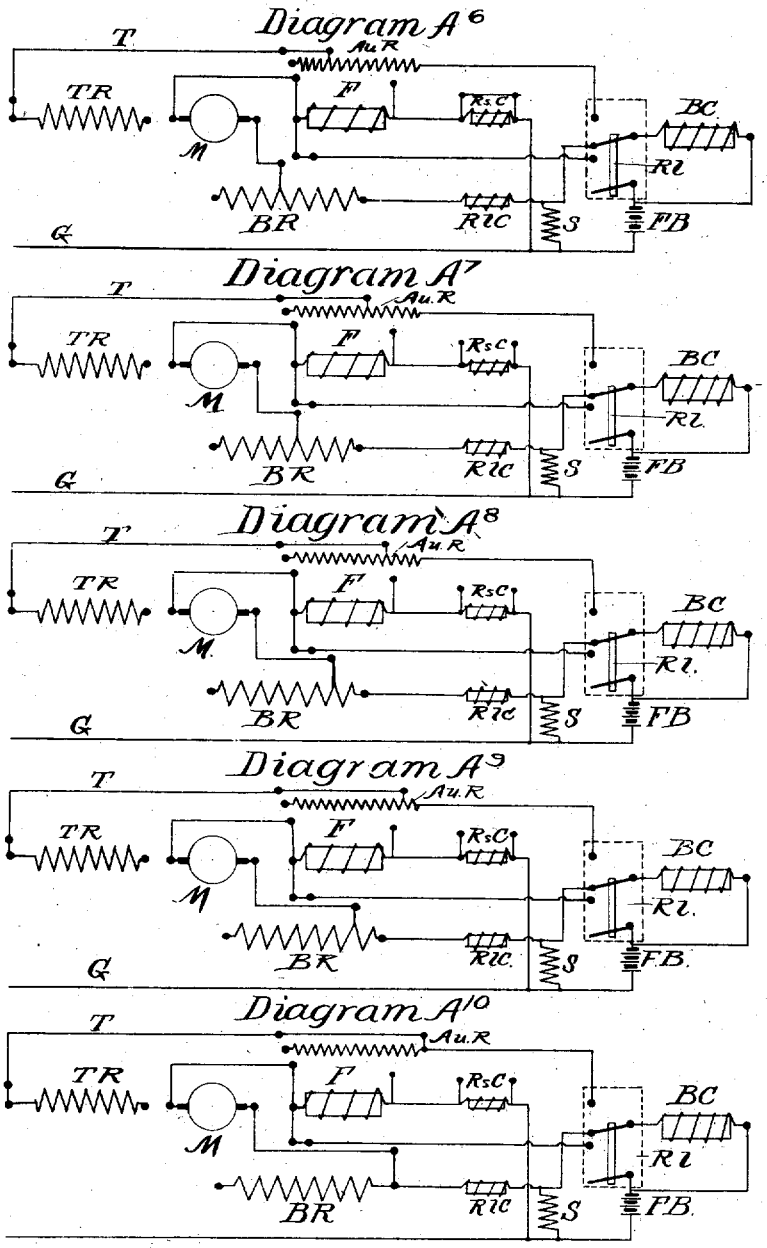
Witnesses
L. F. Browning
W. A. Stahlin
Inventor
Joseph N. Mahoney
By his Attorneys
Baldwin, Davidson & Wright

UNITED STATES PATENT OFFICE.

JOSEPH N. MAHONEY, OF NEW YORK, N. Y., ASSIGNOR TO PRICE, DARLING & COMPANY, OF NEW YORK, N. Y., A FIRM COMPOSED OF JOHN R. PRICE, WILLIAM H. DARLING, WILLIAM C. LOMBARD, AND JOSEPH N. MAHONEY.

ELECTRIC BRAKE FOR VEHICLES.

SPECIFICATION forming part of Reissued Letters Patent No. 12,098, dated March 10, 1903.

Original No. 665,450, dated January 8, 1901. Application for reissue filed January 14, 1903. Serial No. 139,085.

*To all whom it may concern:*

Be it known that I, JOSEPH N. MAHONEY, a citizen of the United States, residing at the city of New York, (Astoria,) in the State of New York, have invented certain new and useful Improvements in Electric Brakes for Vehicles, of which the following is a specification.

This invention is particularly designed for and adapted to electrically-propelled cars deriving current from a conductor or conductors or contacts from which the current is taken by the trolley, brush, or collector carried by the car. It is, however, applicable to other systems—as, for instance, where the source of electrical energy is carried upon the car or vehicle. In the drawings hereof and as hereinafter described it is shown as applied to a trolley-car taking a current from a continuous conductor or conductors arranged either above or below the track or otherwise.

The objects of the invention are to afford complete and perfect control of the car by means of electrically-actuated braking mechanism, which may receive current from the main conductor or trolley-wire, but which primarily gets its current from the driving motor or motors on the car, which are then run as generators. This general plan of operation has heretofore been proposed—as, for instance, in the patent of Price, No. 590,021, dated September 14, 1897; but the present invention, both in matter of organization and results obtained, is in many respects different from what has been disclosed in the Price patent and heretofore proposed by others, all as will hereinafter be apparent.

The invention comprises an organization of apparatus and circuits hereinafter described or equivalent organizations of apparatus and circuits producing actions or results in the braking or controlling of a car or vehicle, as hereinafter set forth.

In the accompanying drawings the invention is shown organized or embodied in the form now deemed the best known.

Figure 2:
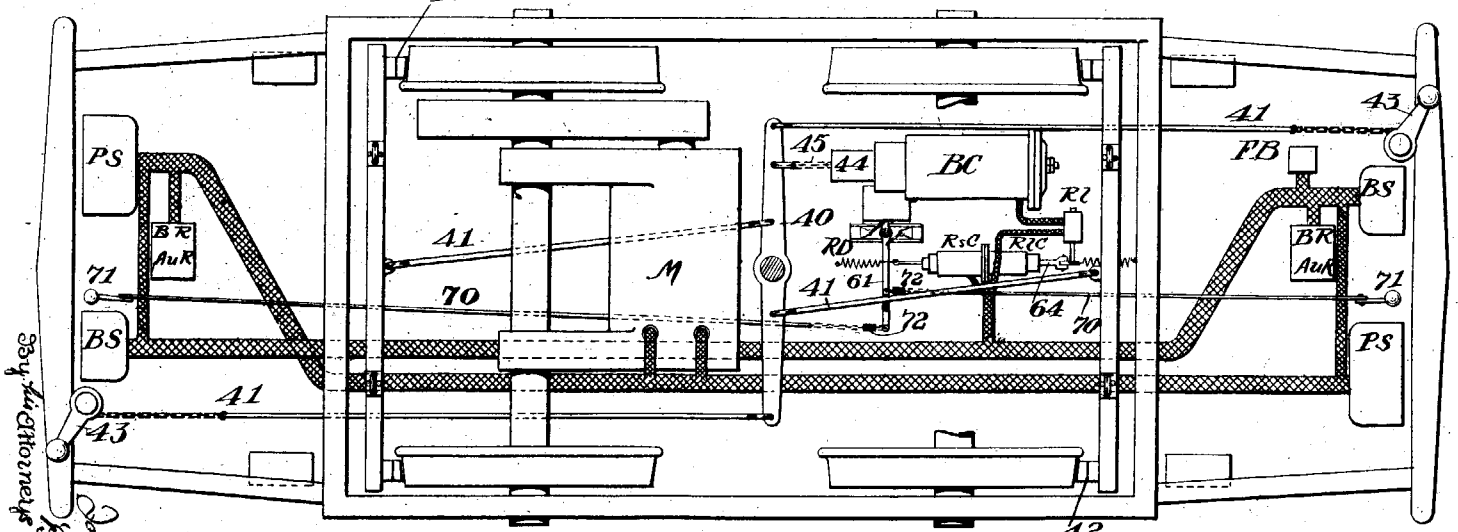
Figure 3:
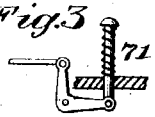

Figure 1 is a diagram view indicating the different pieces of apparatus mounted upon a car and their various circuit connections. Fig. 2 is a plan view indicating the frame, truck, brake-shoes, and beams of any ordinary car construction with my improvements applied thereto; Fig. 3, a detail view showing a foot-actuated tripping device performing a function hereinafter described; Fig. 4, a view in horizontal section and plan showing a set of coils with their pole-piece and armature by which the brake-shoes are applied to the wheels, a retaining device for holding the shoes up to the wheels, and a release mechanism for releasing them; Fig. 5, a section on the line X X, Fig. 4; Fig. 6, a section on the line Y Y, Fig. 4; Fig. 7, a detail view in elevation indicating the fender, a release mechanism for dropping it, a sand-box, and an electromagnetic device for operating it to discharge the sand at will; Fig. 8, a vertical section through the lower part of the brake switch or controller mounted at the end of the car in suitable relation to the ordinary power switch or controller.

Diagrams $A'$ $A^2$ $A^3$ $A^4$ $A^5$ $A^6$ $A^7$ $A^8$ $A^9$ $A^{10}$ show in sequence the various conditions or connections of the different pieces of apparatus corresponding with the various positions of the brake switch or controller.

The reference-letters indicating the main parts of the apparatus in a general way are as follows: T, the trolley conductor or main; TR, the motor resistance; M, the motor; A, the motor-armature; F, the motor-field; R*s* C, the release cylinder or coil; R*l*, the relay; R*l* C, the relay cylinder or coil; BC, the brake cylinder or coil; A*u* R, the auxiliary resistance; BR, the brake resistance; S, the shunt; FB, the flash or exciting battery; G, the ground main or connection; BS, the brake switch or controller; PS, the power switch or controller; RS, the reversing-switch; RD, the brake-retaining device; FC, the fender coil or cylinder; SC, the sand-box coil or cylinder, and LD the brake-switch-locking device.

The several resistances perform functions usual to them and are of ordinary construction. The reversing-switch and the power-switch are each of any ordinary suitable type, and the brake-switch BS may be mechanically of similar construction and need therefore only be shown diagrammatically, as in Fig. 1. The locking device is a lock or catch that is made effective at a certain point in the movement of the brake-switch in such a way that the switch may not be operated to restore the connections to the power-switch for taking current from the main or trolley wire until the power-switch has been thrown off. The releasing-coil may be a coil with a pole-piece and armature, as indicated in Fig. 4, and serves the purpose of releasing the shoes, so that they may not effect the locking of the wheels, and thus cause them to slide upon the rails. This coil or cylinder and the braking coil or cylinder and those for the fender and sand-box may all be in detail of the construction shown in Fig. 4, which shows in section the braking coil or cylinder, its pole-piece, and armature. The flash or exciting battery FB is for exciting the field of the motor, and the relay R*l* is a piece of apparatus for transferring the circuit through the several coils of the brake-cylinder in series from the trolley-wire to the circuit of the motor, which would then be running as a generator in parallel.

Referring to the general diagram view, Fig. 1, and assuming that the reversing-switch is in such position that the contacts or brushes $a$ $a'$ $a^2$ $a^3$ are in the position indicated by the dotted lines $r$ $s$ and that the power-switch is in such position that its contacts or brushes $b$ $b'$ $b^2$ $b^3$ $b^4$ $b^5$ $b^6$ are in the position indicated by the dotted line $p$ $s$ and that the brake-switch is in such position that its contact fingers or brushes $c$ $c'$, &c., are in the position indicated by the dotted lines 1 1, the current from the trolley or supply conductor T will be supplied to the motor for the forward movement of the car. The circuit is from the conductor T to the power-switch brush $b$, thence through the contact-plates of this switch to the brush $b^6$, through the resistance TR and by conductor 11 to the brush $c'$ of the brake-switch, thence to the brush $c^2$ and by wire 12 to the brush $a^3$ of the reversing-switch, thence to the brush $a^2$ of this switch and by wire 13 to one pole of the armature A of the motor, thence from the opposite terminal of the armature by wire 14 to the brush $a'$ of the reversing-switch, the brush $a$ thereof and wire 15 to the brush $c^7$ of the brake-switch, thence to the brush $c^6$ of this switch and by wire 16 to one terminal of the field-winding of the motor, and from the other terminal of this winding by wire 17 through the release-coil R*s* C, and from thence through conductors 18 19 to ground at G. This is the condition illustrated in diagram A'. The further movement of the power-switch PS is usual and merely serves to cut out part or all of the coils of the resistance T R. If now the brake-switch be moved so that its brushes leaves the plates 1 2 and occupy the position indicated by the dotted line 2 2, the circuit through the motor armature and field and release-coil is open. This is the position indicated by diagram A². This is merely a transition position, the action being only to open the trolley-current circuit through the motor. As the brushes $c$, &c., come into the position indicated by the dotted line 3 3 shunts or short circuits are established around the field of the motor and around the release-coil and also around the brake-cylinder coils, which are in circuit with the whole resistance A*u* R, as indicated in diagram A³ and as may readily be traced in the general diagram Fig. 1. This also is merely a transition position of the switch, and the shunting of the motor-field, &c., at this point is for the purpose of preventing sparking when on the return of the movement of the switch the motor-circuit is opened. When the brushes of the brake-switch are brought to the position indicated by the dotted line 4 4, the electromagnetic braking mechanism is thrown into action, the organization and circuits being as follows: The terminals $d$ of the several separate coils $d'$ of the brake-cylinder are then in contact with the brushes $e$ $e'$ of the relay-switch, which brushes are connected in pairs, so that the coils $d'$ are in series, this being the normal position of the relay-switch. Current now enters from the conductor T and thence by wire 20 to the brush $c^{15}$ of the brake-switch, which is now upon the second contact-point of the auxiliary resistance A*u* R, through this resistance, and thence by wires 21 22 to the first brush $e$ of the relay-switch, thence through the coils $d'$ of the brake-cylinder, thence by wire 23 to the contact-brush $c^5$ of the brake-switch, thence through the contact-plates of this switch to the brush $c^3$ thereof, thence by wire 12 to the reversing-switch, through its brushes $a^3$ $a^2$ and by wire 13 through the armature-winding of the motor, by wire 14 to the reversing-switch, through its brushes $a'$ $a$ and by wire 15 to the contact-brush $c^7$ of the brake-switch, thence through contact-plates thereof to the brush $c^{14}$, thence through the resistance BR and by wire 24 to the shunt S, thence through the winding of the relay cylinder or coil R*l* C and by wire 25 through the winding of the fender-coil FC and the sand-box coil SC and by wire 26 to ground at G or the negative terminal. It will be observed that this circuit through the armature-winding contains considerable resistance. There is a parallel or derived circuit through the winding of the motor-field. It may be traced from the brush $c^5$ of the brake-switch, thence to the brush $c^6$, and by wire 16 to one terminal of the field-winding, from the opposite terminal by wires 17 and 27 to the brush $c$, thence to the brush $c^3$, and thence through wire 19 to ground. This is a circuit of relatively small resistance.

The circuit of the flash or exciting battery FB also includes the field-winding and may be traced as follows: from one pole of the battery by wire 28 to wire 23, thence to the brush $c^5$, thence to the brush $c^6$ and by wire 16 through the field-winding, thence by wires 17 and 27 and brake-switch brushes $c$ $c^3$ to wire 19, thence by wire 29 to the contact 30, upon which the brush $e^3$ of the relay-switch rests, and through said brush to the opposite pole of the battery. The relay-coil R$l$ C is so adjusted that these conditions being established and the motor or motors now running as a generator the armature of the coil is attracted (the mechanical connections being shown in Fig. 2) and the relay-switch R$l$ is operated to transfer the brushes $e$ $e'$ away from the contacts $d$ of the brake-cylinder coils and to bring the brushes $f$ into contact therewith. These brushes are so connected that the coils of the brake-cylinder are now connected in parallel and in parallel with the shunt which is in the armature-circuit of the motor. At the same time the field has been excited not only by the current from the trolley main or conductor T, but also by that from the battery FB, the circuit of the battery having, however, been opened by the action of the relay. The motor with the field thus excited now acts as a generator, and the brake-cylinder coils act to apply the brake mechanism, the mechanical details of which operation are hereinafter described. At the same time the fender is dropped by the action of the coil FC and the sand-box mechanism operated to discharge sand by the action of the coil SC. The excitation of the field of the motor now running as a generator might be sufficiently accomplished by the current from the trolley-conductor T, and the battery FB is primarily provided to provide for the contingency, which may readily occur, of the trolley-wheel, shoe, or collector being out of contact with the conductor T or for that of any accident to the circuit of the trolley-conductor or to the dynamos at the power-house. The movement of the brake-switch lever, which establishes the conditions already described and those to be described, occurs, particularly in the event of an emergency stop, with great rapidity. The further movement to bring the contact-brushes $c$, &c., into the positions indicated by the lines 5 6 merely serves to cut out resistance in the auxiliary resistance A$u$ R and the resistance BR. Such is evidently the fact, mechanically considered. So far as the behavior electrically of the apparatus is concerned, it might well be that the brake-switch could be thrown over so rapidly as to be in the position indicated by the dotted line 6 6 before the relay-coil would have time to transfer the brake-cylinder from the trolley to the motor-circuit. The conditions of the apparatus when the brushes are in the positions indicated by the lines 4 4 5 5 6 6 are indicated in the detail diagrams $A^4$ $A^5$ $A^6$. When the contacts of the power-switch pass from the position indicated by the line 6 6 to that of the line 7 7, the release-coil R$s$ C is included in the circuit of the motor-armature, and is consequently energized. In this instance in the way in which the system is shown organized the motor armature and field are in series. This condition is indicated in the detail diagram $A^7$. The circuit of the releasing-coil may be traced as follows, referring to Fig. 1: from the right-hand terminal thereof by wire 17 through the field-winding, thence by wire 16 to the brush $c^6$, thence to the brush $c^2$ and by wire 12 to the reversing-switch, through the brushes $a^3$ $a^2$ of that switch and wire 13 to one terminal of the armature-winding and from the other terminal by wire 14 again to the reversing-switch through the brushes $a'$ $a$ thereof, thence by the wire 15 to the brush $c^7$, thence to the brush $c^{11}$ through part of the resistance BR, thence by wire 24 through the relay-coil R$l$ C, thence over the ground connection to wire 19 and by wire 18 to the other terminal of the release-coil.

The releasing-coil, by the attraction of its armature, performs the following functions: When the brake-shoes are brought against the wheels by the action of the brake coil or cylinder, there is applied to the braking mechanism a locking device, hereinafter described, which holds the shoes in position to which they are drawn in the act of braking the wheels, thus providing against any derangement of other parts of the apparatus or electric circuits. Consequently if the wheels are locked by the action of the shoes (and no means were provided for preventing it) and there is sufficient momentum of the car the car will slide upon the rails—a condition most undesirable both because of the inefficient braking or stopping of the car and because of the wearing of flat faces upon the wheels. The brake-releasing apparatus is designed to obviate this unfavorable condition. When a condition approaching the locking of the wheels by the shoes occurs, the rotation of the armature of the motor (now acting as a generator) is of course very slow, and the current generated thereby is one of small strength. The release-coil is cut into operation by the brake-controller when the brake-controller has been advanced to a position where the braking energy is considerable for the purpose and acts to render the retaining device ineffective, thereby preventing a locking of the wheels. The release-coil may receive current from the motor (or motors) acting as a generator, as shown, or from any source of electrical energy on the car. It is also cut into circuit with the motor or motors when they are taking current from the line and is operative to release the brake-shoes should they be then applied. The release-coil is so proportioned, adjusted, and arranged as to be vitalized by the current under such conditions and acts to throw off the locking device. Thus while the brake-shoes are applied to the wheels by the action of the braking cylinder or coil and a locking device is applied which tends to lock the shoes against the wheels the release-coil constantly tends to throw off the locking device and permit the momentary retraction or easing up of the brake-shoes. The amount of current in the coils of the braking-cylinder when a condition approaching the locking of the wheels occurs is not sufficient to hold up the shoes with sufficient power to lock the wheels; but an increase in speed of rotation of the wheels, and consequently of the motor-armature, immediately develops sufficient current to cause the brake-cylinder to again apply the shoes to the wheels. The action is entirely automatic and is one which while avoiding a locking of the wheels applies the brake-shoes in the most efficient manner for all purposes. The action of the relay-switch R*l* in transferring the coils of the brake-cylinder from a series to a parallel connection is desirable in view of the change in the character of the current, which is then derived from the motor running as a generator and is or may be of less electromotive force and larger volume than the current derived from the trolley-wire. The continued movement of the brake-switch from the position indicated by the line 7 7 to the lines 8 8, 9 9, and 10 10 effects no change in the circuits or apparatus other than the cutting out of resistance from the resistances A*u*, R, and BR. The circuit conditions of each of these positions of the switch are indicated by the detail diagrams $A^8$ $A^9$ $A^{10}$. The brake-switch-locking coil LD may at all times receive current while the power-switch is in the position indicated by the dotted line PS or in any advanced position. I prefer, however, to arrange that the locking-coil shall be energized when the brake-switch has reached the position indicated by the line 4 4. The circuit is from the trolley-conductor T, the contact-brushes of the power-switch, and conductor 30, through the winding of the locking-coil, thence by wire 31 to wire 23 to brake-switch brush $c^5$, thence to brush $c^6$, and thence through the field-winding of the motor to ground. The purpose of this locking device is as follows, the mechanical details being shown in Fig. 8, which indicates partially the brake-switch BS: The armature 32 of the locking-coil is connected at one end to a pivoted catch or latch 33 and is normally retracted by a spring 34. The opposite end of the latch 33 is provided with a hook which normally stands out of the path of a lug or projection 35 on the moving part of the switch BS. When the switch is being advanced in the direction indicated by the arrow in Fig. 8—that is to say, from the position 1 1 to the position 10 10 (indicated in the diagram view Fig. 1)—and in the event that the connections were such as to have already introduced the locking-coil into circuit, as would be the case were the wire 31 from the locking-coil connected to the wire 19, the lug 35 will ride over the inclined outer edge of the latch 33, so that the switch may be advanced, as stated; but as the switch is brought back from the position 10 10 and when it reaches the position indicated by the line 4 4 the lug 35 engages the latch 33 and the switch is locked against further movement in the return direction, and it is impossible to move it farther and throw the braking mechanism out of action until the power-switch PS is operated to break the connection with the trolley-conductor, and thus de-energize the locking-coil and permit the release of the brake-switch. The brake-switch may now be moved from the position 4 4 to the position 3 3, in which the field of the motor, the release-coil, and brake-cylinder coil are shunted, and then by the further movement of the brake-switch the circuit of the motor is opened and the brake-switch finally brought to the position indicated by the line 1 1. The power-switch may now be operated, as in starting the car in the ordinary way, to supply current from the trolley-conductor T for the actuation of the motor to drive the car.

The general arrangements of circuits and the behavior of the different pieces of apparatus having now been indicated, the construction of the apparatus will be described in detail.

The various pieces of apparatus may be mounted upon the car frame or truck, as indicated in Fig. 2, which also shows the cables carrying the conductors already described.

40 indicates the ordinary brake-lever, 41 the ordinary brake-rods or draw-bars, and 42 the brake-shoes.

43 indicates the ordinary manual brake, consisting of a handle, a staff, and a chain connecting the end of the staff to one of the draw-bars 41. In this system, as in all automatic brakes, it is perhaps preferable that the ordinary manual brake should be retained, as some contingency may arise in which its use may be desirable. The armature 44 of the brake-cylinder is connected by a chain with the brake-lever 40, and in this chain an insulation 45 is placed close to the armature for the purpose of insuring the insulation of the coils. What has been termed the "brake-cylinder" is constructed as follows: It is, in fact, a hollow electromagnet of a peculiar and novel construction. It consists, Fig. 4, of an outer shell 46, of iron or steel, within which are disposed the several coils which are brought out to the terminals, as indicated in Fig. 1. The head 47 of the outer shell or cylinder is provided with a cylindrical inwardly-projecting hollow pole-piece 48, in the annular space between which and the shell some of the coils are disposed, the pole-piece projecting halfway or more into the series of coils. The chamber in the hollow pole-piece is tapered, being of smallest diameter adjacent to the head 47. The armature 44 consists of a cylindrical part seated in the end of the shell, which is there contracted in diameter, and of a tapering part of substantially the shape and taper of the chamber in the pole-piece and which when the armature is retracted is preferably partially entered into the taper chamber of the pole-piece. The purpose of this special shape of this part of the armature and of the chamber in the pole-piece is to decrease the air-gap relatively to the travel of the armature. The armature guide-rod 49, sliding in the head 47, is preferably of non-magnetic metal. It will be apparent that the lines of force will be so disposed relatively to the mass of the armature projection and the pole-piece 48 that an efficient pull upon the armature will be exerted through the entire portion of its relatively long stroke. This is due to the taper shape of the socket and pole-piece projection, which I prefer shall be uniform and in straight lines, though I do not desire to limit myself to such specific shape or construction.

On the under side of the part 44 of the armature is a rack 50, engaging a pinion 51, fixed on a shaft 52, on the outer end of which is fixed a gear 53, meshing with a pinion 54, fast on the sleeve 55, turning on a short shaft 56. Mounted on this sleeve is a flanged wheel 57, in which the sleeve may freely turn in the direction indicated by the arrow in Fig. 6, which is a direction of rotation imparted to the sleeve when the brake-cylinder or electromagnet draws the brake-shoes against the wheels. In a cavity constituting a lateral enlargement of the wheel bearing upon the sleeve is arranged one or more rollers 58, one roller being shown. The wall of this cavity is inclined at 59, so that on a tendency toward a reverse movement of the sleeve 58, due to the retraction of the brake-shoes, the roller by a wedge-like action clamps the sleeve rigidly to the wheel, which is, however, prevented from turning by a friction-strap 60, the ends of which are attached on opposite sides of the pivot of a lever 61, normally held by a spring 62 in such position that the strap locks the wheel against rotation. The release-coils Rs C may be an electromagnetic apparatus constructed in all respects the same as the brake-coil BC. (Shown in detail in Fig. 4.) Its armature is connected by a rod 63 to the lever 61, and when the coil is energized and its armature attracted the tension of the spring 62 is overcome and the lever 61 drawn in the direction to release the wheel 57 from the braking action of the friction-strap. The relay-coil Rl C has its inclosing shell of magnetic metal (which may be the same as that of the brake-coil BC) bolted to the similar shell of the release-coil, as indicated in Figs. 2 and 4, and the armature of the relay-coil is connected by a rod 64 to the relay-switch R′, which controls the connections of the coils of the brake-cylinder, as already described.

The fender-coil FC is or may be an electromagnetic apparatus constructed similarly to the brake-coil BC, and when it is energized its armature withdraws a catch 65 from engagement with a normally elevated fender 66, which then by its own weight and by the action of a spring 67 descends upon or in close juxtaposition to the track or road-bed. The sand-box coil SC is or may be an electromagnetic device of the same construction as the brake-cylinder BC, and on its being energized the discharge device of a sand-box 67 of ordinary or suitable construction is operated to discharge sand upon the rails, this operation occurring whenever the brake-cylinder is thrown into action. The circuit connections of the sand-box coil and the arrangement of the apparatus are indicated in Fig. 7, and, as will be apparent from an examination of that figure, the circuit through the coil SC will be intermittently shunted, and consequently the armature of the coil will be intermittently attracted and withdrawn. The armature is connected by a rod 68 with the sand agitating and discharge devices within the box, to which also, or directly to the rod 68, is applied a spring 69, that serves to retract the armature when the current is shunted from the coil SC.

The brake-switch-locking device LD is or may be an electromagnetic device of the same construction as that of the brake-cylinder BC.

To provide manual control of the lever 61 to effect at will the release of the brake-locking devices, this lever is connected by rods and chains 70 with foot trip devices 71, located at each end of the car, and to insure proper insulation of the several electrical apparatus an insulation 72 is interposed in each such connection 70. A system employing a ground connection has been shown. Obviously the invention is applicable to other arrangements of circuits. It will be observed that the release-coil is in circuit when the brake-switch is in its normal position, so that it acts to release the locking device when the power-switch is moved to admit current to the motor; also, that during the earlier positions to which the brake-switch is moved it is out of operation, (being shunted in the particular organization which I have elected to illustrate,) and hence the vehicle may be arrested by the application of the brakes and the brakes remain locked to the wheels, to be, however, released by the action of the coil when the brake-switch is returned to normal position. Provision is thus made for holding the car, as on a grade or otherwise, when no current is developed in the motor-circuit. When the brake-switch is moved farther, as for an emergency stop, then the release-coil is put into operative relation to its circuit and acts as already described. The motorman has therefore nothing special to learn or do, and complete control of the car under all conditions is afforded.

It is obvious that some of the features of my invention affording certain novel results may be used without the others, that in respect to the several operations and the general operation of the system as a whole the different pieces of apparatus may vary widely in construction from what is shown in the drawings and above described without departing from the invention, that many variations in the electrical connections may be made, for that is largely a mere matter of wiring, and that the system is applicable in general and in detail to cars having more than one motor, the application of what has been shown to multiple motors being a matter of adaptation, wiring, and arrangement of contacts.

I claim as my invention—

1. The combination with an electric motor mounted upon a vehicle, circuit connections for supplying it with current from a suitable source, braking mechanism and an electromagnetic brake-mechanism-operating apparatus, of a controller or switch that cuts off from the motor the current that actuates it for the movement of the vehicle, effects the excitation of the motor-field by current from said source and includes the winding of the brake-operating apparatus in the circuit of said source, and an electrically-operated relay in the circuit of the motor then operating as a generator that acts to transfer the winding of the brake-operating apparatus to the circuit of the motor.

2. The combination with an electric motor mounted upon a vehicle, circuit connections for supplying it with current from a suitable source, braking mechanism and electromagnetic brake-mechanism-operating apparatus having multiple windings, of a controller or switch and contacts and circuit connections by which upon the operation of such switch current for the movement of the vehicle is cut off from the motor, the windings of the brake-operating apparatus are included in series in the circuit of said source and current is supplied to the field-winding of the motor to excite it to act as a generator, and an electrically-actuated relay included in the circuit of the motor now acting as a generator to transfer the windings from the circuit of said source into the motor-circuit in parallel.

3. The combination with an electric motor mounted upon a vehicle, circuit connections for supplying it with current from a suitable source, braking mechanism and electromagnetic brake-mechanism-operating apparatus having multiple windings, of means for opening the circuit between the motor and said source, including the windings of the brake-operating apparatus in the circuit of said source, and exciting the field of the motor so that it will operate as a generator, and an electrically-actuated relay in the motor-circuit then running as a generator, operating to transfer the windings of the brake-operating apparatus from the circuit of said source to the motor-circuit.

4. The combination of an electric motor mounted upon a vehicle, circuit connections for supplying it with current from a suitable source, braking mechanism and an electromagnetic brake-mechanism-operating apparatus, of a battery or second source of electrical energy carried upon the vehicle, an electrically-operated relay or switch device, a controller or switch and contacts and circuit connections whereby on the operation of the controller the circuit from said first-named source to the motor is opened, the winding of the brake-operating apparatus included in the circuit from said source, the current from said battery or second-mentioned source of electrical energy is directed through the field-winding of the motor and the relay included in the circuit of the motor now running as a generator to transfer the winding of the brake-operating apparatus to the circuit of the motor.

5. The combination of an electric motor mounted upon a vehicle, circuit connections for supplying it with current from a suitable source, braking mechanism and an electromagnetic brake-mechanism-operating apparatus, of a battery or second source of electrical energy carried upon the vehicle, an electrically-operated relay or switch device, a controller or switch, contacts and circuit connections whereby on the operation of the controller the circuit from said first-named source to the motor is opened, the winding of the brake-operating apparatus included in the circuit from said source, the current from said battery or second-mentioned source of electrical energy is directed through the field-winding of the motor and the relay included in the circuit of the motor now running as a generator to transfer the winding of the brake-operating apparatus to the circuit of the motor, and an electromagnetic device for releasing the fender also included in the circuit of the motor when running as a generator.

6. The combination of an electric motor mounted upon a vehicle, circuit connections for supplying it with current from a suitable source, braking mechanism and an electromagnetic brake-mechanism-operating apparatus, of a battery or second source of electrical energy carried upon the vehicle, an electrically-operated relay or switch device, a controller or switch, contacts and circuit connections whereby on the operation of the controller the circuit from said first-named source to the motor is opened, the winding of the brake-operating apparatus included in the circuit from said source, the current from said battery or second-mentioned source of electrical energy is directed through the field-winding of the motor and the relay included in the circuit of the motor now running as a generator to transfer the winding of the brake-operating apparatus to the circuit of the motor, and an electromagnetic device also included in the circuit of the motor when running as a generator for operating the sand-discharge devices.

7. The combination of an electric motor mounted upon a vehicle, circuit connections for supplying it with current from a suitable source, braking mechanism and an electromagnetic brake-mechanism-operating apparatus, of a battery or second source of electrical energy carried upon the vehicle, an electrically-operated relay or switch device, a controller or switch, contacts and circuit connections whereby on the operation of the controller the circuit from said first-named source to the motor is opened, the winding of the brake-operating apparatus included in the circuit from said source, the current from said battery or second-mentioned source of electrical energy is directed through the field-winding of the motor and the relay included in the circuit of the motor now running as a generator to transfer the winding of the brake-operating apparatus to the circuit of the motor, an electromagnetic device for releasing the fender also included in the circuit of the motor when running as a generator, and an electromagnetic device also included in the circuit of the motor when running as a generator for operating the sand-discharge devices.

8. The combination of a motor mounted upon a vehicle and adapted to be operated by current from a suitable source, a power-switch for controlling the admission of current to the motor from said source, braking mechanism, an electrically-operated brake-mechanism-operating apparatus, a switch for controlling its action, and an electrically-operated locking device applied to the brake-switch on the actuation of such switch and which after the actuation of the brake-switch prevents its return to normal position until after the power-switch for admitting current to the motor is opened.

9. The combination of a motor mounted upon a vehicle and adapted to be operated by current from a suitable source, a power-switch for controlling the admission of current to the motor from said source, braking mechanism, an electrically-operated brake-mechanism-operating apparatus, a switch for controlling its action, an electromagnetic locking device applied to the brake-switch and receiving current from said source when the power-switch is in the position to admit current to the motor, and acting after the brake-switch has been moved forward to prevent its return to normal position until the power-switch is opened.

10. The combination with an electric motor mounted upon a vehicle, circuit connections for supplying it with current from a suitable source for the forward movement of the vehicle, braking mechanism and electromagnetic brake-mechanism-operating apparatus, of a controller or switch and contacts and circuit connections by which upon the operation of such switch current for the movement of the vehicle is cut off from the motor, the field of the motor shunted, the shunt then opened, and then the field of the motor excited so that it will act as a generator and the brake-operating apparatus actuated by the current therefrom to effect the application of the brakes; whereby upon the return movement of the switch the field of the motor is shunted and so deënergized before the generator-circuit of the armature is opened.

11. The combination with an electric motor mounted upon a vehicle, circuit connections for supplying it with current from a suitable source, braking mechanism and an electromagnetic brake-mechanism-operating apparatus, of means for cutting off from the motor current for the movement of the vehicle, introducing the brake-mechanism-operating apparatus into the circuit of said source, and for exciting the field of the motor so that it will run as a generator, and an electrically-operated relay or switch included in the circuit of the motor now running as a generator and acting to transfer the winding of the brake-mechanism-operating apparatus into the motor-circuit.

12. The combination with an electric motor mounted upon a vehicle, circuit connections for supplying it with current from a suitable source, braking mechanism, and electromagnetic brake-mechanism-operating apparatus having multiple windings, of a controller or switch that cuts off from the motor the current that actuates it for the propulsion of the vehicle, includes the winding of the brake-operating apparatus in the circuit of said source and effects the excitation of the motor-field by admitting thereto current from a suitable source, an electrically-operated relay in the circuit of the motor then running as a generator and contacts and circuit connections whereby upon the operation of said relay the windings of the brake-operating apparatus are transferred to the motor-circuit and commutated to adapt them to the current generated by the motor.

13. The combination with the wheels and braking mechanism of a vehicle, of an electrically-operated apparatus for applying the brakes to wheels, a brake-locking mechanism tending to lock the brakes in the forward position into which they are drawn, an electrically-operated brake-release mechanism, circuit connections and a brake-switch movable in one direction from its normal inactive position and on the actuation of which to apply the brakes the brake-applying mechanism and the release mechanism are both included in the brake-circuit whereby the release mechanism is energized while the brake-applying mechanism is in operation to prevent the locking and slipping of the wheels on the rails.

14. The combination with the wheels and brake mechanism of a vehicle, of an electromagnetic apparatus for applying the brakes to the wheels, a locking mechanism tending to lock the brakes in the forward position to which they are drawn, an electromagnetic apparatus receiving current for its vitalization at the same time that the brake-actuating apparatus receives its current and tending to throw the brake-locking mechanism out of action, and a brake-switch on the movement of which from its normal or inactive position in the direction to apply the brakes, the brake-applying mechanism and the apparatus for throwing the locking mechanism out of action are both energized.

15. The combination with the wheels and brake mechanism of a vehicle of an electromagnetic brake-applying mechanism, a brake-locking mechanism, an electromagnetic brake-releasing mechanism, a motor, a power-switch for admitting current to the motor from a suitable source, a brake-switch and circuit connections by which on the movement of the switch from its normal position in a direction to apply the brakes, current from said source is cut off from the motor, the motor excited and the brake-applying mechanism and release mechanism are both included in the circuit of the motor then running as a generator.

16. The combination with the wheels and brake mechanism of a vehicle, of an electromagnetic apparatus for applying the brakes to the wheels, a locking mechanism tending to lock the brakes in the forward position to which they are drawn, an electromagnetic releasing apparatus adapted to trip or throw said locking mechanism out of action, an electric motor mounted on the vehicle and adapted to propel it, a power switch or controller for admitting current from a suitable source to the motor, a brake switch or controller for admitting current to the apparatus for applying the brakes to the wheels and contacts and circuit connections whereby in the earlier or first movements of the brake-switch said releasing apparatus is rendered inoperative but during a further movement of said switch current is admitted to its winding to render it operative.

17. The combination with the wheels and brake mechanism of a vehicle, of an electromagnetic apparatus for applying the brakes to the wheels, a locking mechanism tending to lock the brakes in the forward position to which they are drawn, an electromagnetic releasing apparatus adapted to trip or throw said locking mechanism out of action, an electric motor mounted on the vehicle and adapted to propel it, a power switch or controller for admitting current from a suitable source to the motor, a brake switch or controller for admitting current to the apparatus for applying the brakes to the wheels and contacts and circuit connections whereby the winding of said releasing apparatus is shunted in the earlier movements of the brake-switch from its normal position to render it inoperative and said shunt is opened and said apparatus thrown into active operation during further movement of the brake-switch.

18. The combination with the wheels and brake mechanism of a vehicle, of an electromagnetic apparatus for applying the brakes to the wheels, a locking mechanism tending to lock the brakes in the forward position to which they are drawn, an electromagnetic releasing apparatus adapted to trip and throw said locking mechanism out of action, an electric motor mounted on the vehicle and adapted to propel it, a power switch or controller for admitting current from a suitable source to the motor, circuit connections by which when the power-switch is in position to admit current to the motor the electromagnetic releasing apparatus is included in the circuit of said source, a brake-switch and circuit connections by which on the actuation of the latter switch the apparatus for applying the brakes and the releasing apparatus are included in the braking-circuit whereby the releasing apparatus is energized when the brake-switch is returned to its normal position and the power-switch is in a position to admit current to the motor.

19. The combination with the wheels and brake mechanism of a vehicle, of an electromagnetic apparatus for applying the brakes to the wheels, a locking mechanism tending to lock the brakes in the forward position to which they are drawn, an electromagnetic releasing apparatus adapted to trip or throw said locking mechanism out of action, an electric motor on the vehicle and adapted to propel it, a power switch or controller for admitting current from a suitable source to the motor, a brake switch or controller for admitting current to the apparatus for applying the brakes to the wheels, and contacts and circuit connections whereby when the brake-switch is moved from its normal position to several of its earlier positions the winding of said releasing apparatus is shunted and the shunt opened during further movements of said switch, and whereby when the brake-switch is in its normal position and the power-switch is in position to admit current to the motor the winding of said releasing apparatus is included in circuit with the motor.

20. The combination with an electric motor mounted upon a vehicle, circuit connections for supplying it with current from a suitable source, braking mechanism and an electromagnetic brake-mechanism-operating apparatus, of a controller or switch that cuts off from the motor the current that actuates it for the movement of the vehicle, includes the winding of the brake-operating apparatus in the circuit of said source, and an electrically-operated relay in the circuit of the motor then operating as a generator that acts to transfer the winding of the brake-operating apparatus to the circuit of the motor.

21. The combination with an electric motor mounted upon a vehicle, circuit connections for supplying it with current from a suitable source, braking mechanism and electromagnetic brake-mechanism-operating apparatus having multiple windings, of a controller or switch and contacts and circuit connections by which upon the operation of such switch current for the movement of the vehicle is cut off from the motor, the windings of the brake-operating apparatus are included in series in the circuit of said source, and an electrically-actuated relay included in the circuit of the motor now acting as a generator to transfer the windings from the circuit of said source into the motor-circuit in parallel.

22. The combination with an electric motor mounted upon a vehicle, circuit connections for supplying it with current from a suitable source, braking mechanism and electromagnetic brake-mechanism-operating apparatus having multiple windings, of means for opening the circuit between the motor and said source, including the windings of the brake-operating apparatus in the circuit of said source, and an electrically-actuated relay in the motor-circuit then running as a generator, operating to transfer the windings of the brake-operating apparatus from the circuit of said source to the motor-circuit.

23. The combination of a motor mounted upon a vehicle and adapted to be operated by current from a suitable source, a power-switch for controlling the admission of current to the motor from said source, braking mechanism, an electrically-operated brake-mechanism-operating apparatus, a switch for controlling its action, and an automatically-operated locking device applied to the brake-switch on the actuation of such switch and which after the actuation of the brake-switch prevents its return to normal position until after the power-switch for admitting current to the motor is opened.

24. The combination with an electric motor mounted upon a vehicle, circuit connections for supplying it with current from a suitable source for the forward movement of the vehicle, braking mechanism and electromagnetic brake-mechanism-operating apparatus, of a controller or switch and contacts and circuit connections by which, upon the operation of such switch, current for the movement of the vehicle is cut off from the motor, the field of the motor shunted, the shunt then opened, and the brake-operating apparatus actuated by the current from the motor to effect the application of the brakes; whereby upon the return movement of the switch the field of the motor is shunted and so deënergized before the generator-circuit of the armature is opened.

25. The combination with an electric motor mounted upon a vehicle, circuit connections for supplying it with current from a suitable source, braking mechanism and an electromagnetic brake-mechanism-operating apparatus, of means for cutting off from the motor, current for the movement of the vehicle and introducing the brake-mechanism-operating apparatus into the circuit of said source, and an electrically operated relay or switch included in the circuit of the motor now running as a generator and acting to transfer the winding of the brake-mechanism-operating apparatus into the motor-circuit.

26. The combination with an electric motor mounted upon a vehicle, circuit connections for supplying it with current from a suitable source, braking mechanism, and electromagnetic brake-mechanism-operating apparatus having multiple windings, of a controller or switch that cuts off from the motor the current that actuates it for the propulsion of the vehicle and includes the winding of the brake-operating apparatus in the circuit of said source, an electrically-operated relay in the circuit of the motor then running as a generator and contacts and circuit connections whereby upon the operation of said relay the windings of the brake-operating apparatus are transferred to the motor-circuit and commutated to adapt them to the current generated by the motor.

27. The combination with the wheels and brake mechanism of a vehicle of an electromagnetic brake-applying mechanism, a brake-locking mechanism, an electromagnetic brake-releasing mechanism, a motor, a power-switch for admitting current to the motor from a suitable source, a brake-switch and circuit connections by which on the movement of the switch from its normal position in a direction to apply the brakes, current from said source is cut off from the motor, and the brake-applying mechanism and release mechanism are both included in the circuit of the motor then running as generator.

28. The combination, on an electrically-driven vehicle or car, of the electric motor, a power-switch controlling current from the main source to the motor, an electromagnetic brake-winding, a brake-switch, and means whereby when the brake-switch is moved from its normal or inactive position the following automatically occurs, first current from the main source is sent through the brake-winding, second the motor is connected as a generator in closed circuit, and third on proper rise of current in said generator-circuit the brake-winding is included therein.

29. The combination, on an electrically-driven vehicle or car, of the electric motor, a power-switch controlling current from the main source to the motor, an electromagnetic brake-winding, a brake-switch, and means whereby when the brake-switch is moved from its normal or inactive position the following automatically occurs, first current from the main source is sent through the brake-winding, second the motor is connected as a generator in closed circuit, and third on proper rise of current in said generator-circuit the brake-winding is included therein, and fourth the main source disconnected from the brake-winding.

30. The combination, on an electrically-driven vehicle or car, of the electric motor, a power-switch controlling current from the main source to the motor, an electromagnetic brake-winding, a brake-switch, and means whereby when the brake-switch is moved from its normal or inactive position the following automatically occurs, first current from the main source is sent through the brake-winding, second the motor is connected as a generator in closed circuit, third on proper rise of current in said generator-circuit the brake-winding is included therein, and fourth the main source disconnected from the brake-winding, and on reduction of current in said generator-circuit below that required to effect the inclusion of the brake-winding in said generator-circuit, the brake-winding is cut out of the generator-circuit and again included in circuit with the main source.

31. The combination, on an electrically-driven vehicle or car, of a motor, a power-switch controlling current from the main source to the motor, an electromagnetic brake-winding, a brake-switch, means whereby when the brake-switch is moved from its normal position the brake-winding is automatically included in the circuit of the main source and the motor is automatically connected as a generator in closed circuit independent of the brake-winding, and means automatically actuated by current in said generator-circuit to thereafter connect the brake-winding in said circuit irrespective of the position of the power-switch.

32. The combination, on an electrically-driven vehicle or car, of a motor, a power-switch controlling current from the main source to the motor, an electromagnetic brake-winding, a brake-switch, means whereby when the brake-switch is moved from its normal position the brake-winding is automatically included in the circuit of the main source and the motor is automatically connected as a generator in closed circuit independent of the brake-winding, means automatically actuated by current in said generator-circuit to thereafter connect the brake-winding in said circuit irrespective of the position of the power-switch and means controlled by the movement of the brake-switch to regulate the braking action.

33. The combination, on an electrically-driven vehicle or car, of a motor, a power-switch controlling current from the main source to the motor, an electromagnetic brake-winding, a brake-switch, means whereby when the brake-switch is moved from its normal position the brake-winding is automatically included in the circuit of the main source and the motor is automatically connected as a generator in closed circuit independent of the brake-winding, means automatically actuated by the current in said generator-circuit to thereafter connect the brake-winding in said circuit irrespective of the position of the power-switch and means controlled by the movement of the brake-switch for regulating the braking action when the brake-winding is energized by current either from the main source or from the motor running as a generator.

34. The combination, on an electrically-driven vehicle or car, of a motor, a power-switch controlling current from the main source to the motor, an electromagnetic brake-winding, a brake-switch, means whereby when the brake-switch is moved from its normal position the brake-winding is automatically included in the circuit of the main source and the motor is automatically connected as a generator in closed circuit independent of the brake-winding, and means operated by rise of current in the generator-circuit to include automatically the brake-winding therein and disconnect it from the circuit of the main source, and on diminution of current in said generator-circuit to automatically cut out the brake-winding from said circuit and include said winding again in the circuit with the main source.

35. The combination, on an electrically-driven vehicle or car, of a motor, a power-switch controlling current from the main source to the motor, an electromagnetic brake-winding, a brake-switch, means whereby when the brake-switch is moved from its normal position the brake-winding is automatically included in the circuit of the main source and the motor is automatically connected as a generator in closed circuit independent of the brake-winding, means operated by rise of current in the generator-circuit to include automatically the brake-winding therein and disconnect it from the circuit of the main source, and on diminution of current in said generator-circuit to automatically cut out the brake-winding from said circuit and include said winding again in circuit with the main source, and means controlled by the brake-switch for regulating the braking action of the brake-winding when connected either in the generator-circuit or in the circuit of the main source.

36. The combination, on an electrically-driven vehicle or car, of the electric motor, a power-switch controlling current from the main source to the motor, a reversing-switch, a brake-switch and means whereby when the brake-switch is moved from its normal position, the following automatically occurs irrespective of the position of the power-switch and of the direction for which the reversing-switch is set: the motor is disconnected from the main source, the brake-winding included in said source, the motor connected in closed circuit as a generator and on rise of current in said generator-circuit the brake-winding is included therein and disconnected from the main source.

37. In an electric braking system for cars or vehicles, the combination of the electric motor, a source of energy from which it is supplied, an electromagnetic brake-winding, brake-switch contacts and means whereby when the brake-switch contacts are moved from normal position the brake-winding is automatically included in circuit with the main source, the motor automatically connected in closed circuit as a generator and on proper rise of current in said generator-circuit the brake-winding is automatically included therein.

38. In an electric braking system for cars or vehicles, the combination of the electric motor, a source of energy from which it is supplied, an electromagnetic brake-winding, brake-switch contacts and means whereby when the brake-switch contacts are moved from normal position the brake-winding is automatically included in circuit with the main source, the motor automatically connected in closed circuit as a generator and on proper rise of current in said generator-circuit the brake-winding is automatically included therein and disconnected from the main source.

39. In an electric braking system for cars or vehicles, the combination of the electric motor, a source of energy from which it is supplied, an electromagnetic brake-winding, brake-switch contacts and means whereby when the brake-switch contacts are moved from normal position the brake-winding is automatically included in circuit with the main source, the motor automatically connected in closed circuit as a generator and on proper rise of current in said generator-circuit the brake-winding is automatically included therein and disconnected from the main source and on reduction of current in the generator-circuit the brake-winding is automatically cut out of said circuit and again connected in the circuit of the main source.

40. In an electric braking system for cars or vehicles, the combination of an electric motor, a main source from which it is supplied, electromagnetic brake-applying devices, brake-switch contacts, and means whereby when said contacts are moved from normal position, the main source is automatically disconnected from the motor and the winding of the brake-applying devices included in circuit with said source, the motor connected on closed circuit as a generator, means whereby on rise of current in the generator-circuit the winding of the brake-applying devices is included therein, and an electromagnetic brake-releasing device in the generator-circuit.

JOSEPH N. MAHONEY.

Witnesses:

EDWARD C. DAVIDSON,
WILLIAM A. STALELIN.